US008678352B2

(12) United States Patent
Lawson et al.

(10) Patent No.: US 8,678,352 B2
(45) Date of Patent: Mar. 25, 2014

(54) WIRELINE INTERVENTION SYSTEM

(75) Inventors: Drummond Lawson, Aberdeenshire (GB); Borre Fossli, Oslo (NO)

(73) Assignees: Ocean Riser System AS, Oslo (NO); Lewis Limited, Abderdeen (GB)

(*) Notice: Subject to any disclaimer, the term of this patent is extended or adjusted under 35 U.S.C. 154(b) by 883 days.

(21) Appl. No.: 12/531,056

(22) PCT Filed: Mar. 17, 2008

(86) PCT No.: PCT/GB2008/000940
§ 371 (c)(1),
(2), (4) Date: Dec. 23, 2009

(87) PCT Pub. No.: WO2008/113997
PCT Pub. Date: Sep. 25, 2008

(65) Prior Publication Data
US 2010/0104372 A1    Apr. 29, 2010

(30) Foreign Application Priority Data
Mar. 16, 2007   (GB) .................................. 0705110.5

(51) Int. Cl.
B66D 1/48          (2006.01)
(52) U.S. Cl.
USPC ............ 254/277; 254/327; 254/336; 254/337
(58) Field of Classification Search
USPC ........................... 254/277, 326, 327, 336, 337
See application file for complete search history.

(56) References Cited

U.S. PATENT DOCUMENTS

| 3,707,922 | A | * | 1/1973 | Dillon ............................ 104/114 |
| 3,713,548 | A | * | 1/1973 | Hanke ........................ 414/138.3 |
| 3,785,511 | A | * | 1/1974 | Bonnamy et al. .......... 414/139.7 |
| 3,871,527 | A | * | 3/1975 | Schimmeyer et al. ........ 212/308 |
| 4,117,692 | A | * | 10/1978 | Oberg ........................... 405/166 |
| 4,251,059 | A | * | 2/1981 | Fougea ......................... 254/338 |
| 4,638,978 | A | * | 1/1987 | Jordan ......................... 254/228 |
| 5,062,048 | A |   | 10/1991 | Coulter et al. |
| 5,233,139 | A | * | 8/1993 | Hofmann ..................... 187/393 |
| 5,566,786 | A | * | 10/1996 | De Angelis et al. .......... 187/266 |
| 6,193,016 | B1 | * | 2/2001 | Hollowell et al. ............ 187/250 |
| 6,216,789 | B1 |   | 4/2001 | Lorsignol et al. |
| 6,926,260 | B1 | * | 8/2005 | De Groot et al. ............. 254/277 |
| 7,134,645 | B1 | * | 11/2006 | Johnson et al. ............... 254/338 |
| 7,389,973 | B1 | * | 6/2008 | Chou et al. .................... 254/277 |
| 2003/0052148 | A1 | * | 3/2003 | Rajala et al. ..................... 226/44 |
| 2004/0244982 | A1 |   | 12/2004 | Chitwood et al. |

FOREIGN PATENT DOCUMENTS

| DE | 195 01 982 A1 | 7/1996 |
| GB | 1 165 719 | 10/1969 |
| GB | 2 417 939 A | 3/2006 |

OTHER PUBLICATIONS

International Search Report for International Application No. PCT/GB2008/000940 (Aug. 20, 2008).
Search Report under Section 17 for Application No. GB0804913.2 (May 30, 2008).
Search Report under Section 17 for Application No. GB0705110.5 (Aug. 10, 2007).

* cited by examiner

*Primary Examiner* — Emmanuel M Marcelo
(74) *Attorney, Agent, or Firm* — Jenkins, Wilson, Taylor & Hunt, P.A.

(57) ABSTRACT

An apparatus for controlling tension in a wireline (4), the apparatus comprising a reel (3) mounted on a vessel or surface platform for controlling a wire in a wireline operation, a primary drive means (5) between the reel and a subsea installation around which the wireline is wound and control means for synchronizing the operation of the driver with the reel.

18 Claims, 13 Drawing Sheets

WIRELINE INTERVENTION SYSTEM

This invention relates to a wireline intervention apparatus and method and more particularly to a deepwater wireline intervention apparatus and method used for running and retrieving a tool string into and from a subsea installation.

Current lightweight wireline intervention utilises standard wireline operating techniques to manipulate the wireline in order to run and retrieve the tool string into and from a subsea installation and also to operate the tools and perform operations in the down hole environment.

On land rigs the wireline enters the well bore directly, with the wire being more or less taut between the reel and a pressure control head installed at the well head. Any movement and/or tension on the reel by the operator is effectively transferred directly to a corresponding movement and/or tension of the wireline in the well bore. By this means the wireline operator can relate manipulation of the wire on the reel directly to what is happening downhole and carry out a variety of tasks.

Subsea wireline intervention differs in that the pressure control head is located on the sea floor at the top of the subsea installation. The wire passes from the reel on the surface as normal but then passes through the water column between the surface platform or vessel before entering the pressure control head.

On relatively shallow subsea wells the wire being directly exposed to the environmental forces of current and wave action does not present a significant problem and the weight of the tool string is usually sufficient to provide an acceptable feel and response of the wire in the well bore in response to input actions at the reel.

However on deepwater interventions the length of the exposed wire and the environmental forces acting on it means that any particular movement on the reel be it applied tension or a specific length of reel in or pay out will not be transferred directly downhole to the tool mounted on the end of the wire but will in whole or in part be absorbed by the straightening or slackening of the length of wire exposed in open water.

It is an object of the present invention to provide an apparatus for and a method by which the normal, well established techniques used by wireline operators on the wireline reel can be transferred to corresponding movement and tension of the wire in the well bore while negating the effects of environmental loads on the length of exposed wire.

According to one aspect of the present invention there is provided an apparatus for controlling tension in a wireline, the apparatus comprising a reel mounted on a vessel or surface platform for controlling a wire in a wireline operation, a primary drive means between the reel and a subsea installation around which the wireline is wound and control means for synchronising the operation of the driver with the reel Preferably the primary drive means is mounted on or adjacent the subsea installation.

Conveniently the primary drive means comprises a roller.

Alternatively the primary drive means comprises a plurality of sheaves.

Preferably the sheaves are mounted on a common axle and are angled with respect to the axle.

Advantageously two sets of sheaves are provided.

Preferably the sets of sheaves are mounted on a mandrel one above the other.

Advantageously a secondary drive means is mounted on the vessel or surface platform between the reel and the primary drive means.

Conveniently one or more idler rollers are mounted between the primary drive means and the subsea installation and/or the reel and the secondary drive means.

Advantageously one of said idler rollers is position adjustable to alter the length of wire between the primary drive means and the subsea installation and/or the length of wire between the reel and the primary drive means.

Preferably driving means are provided for altering the position of the idler roller(s).

Conveniently return means are provided for restoring the idler roller to the neutral position.

Alternatively a winch is mounted on the vessel or surface platform between the reel and the primary drive means.

Preferably sensors are provided on the primary drive means for monitoring operation conditions of the wire.

According to a further aspect of the present invention there is provided a vessel comprising a wireline intervention apparatus according to the first aspect of the invention.

According to a further aspect of the present invention there is provided a method of controlling the tension in a wire of a wireline system, said method comprising the steps of passing the wire around a primary drive means between a reel on a surface platform or vessel and a sub sea installation, setting the tension of the wire at a predetermined level and controlling the operation of the reel and the drive means in synchronisation to maintain the tension in the wire at the predetermined level during wirelining operations.

Preferably the method includes the step of mounting the primary drive means on or adjacent the subsea installation.

Advantageously the method further comprises the steps of mounting a further drive means between the reel and the subsea installation and controlling both primary and secondary drive means in synchronisation with the reel.

One embodiment of the present invention will now be described with reference to and as shown in the accompanying drawings in which.

Figure 1:
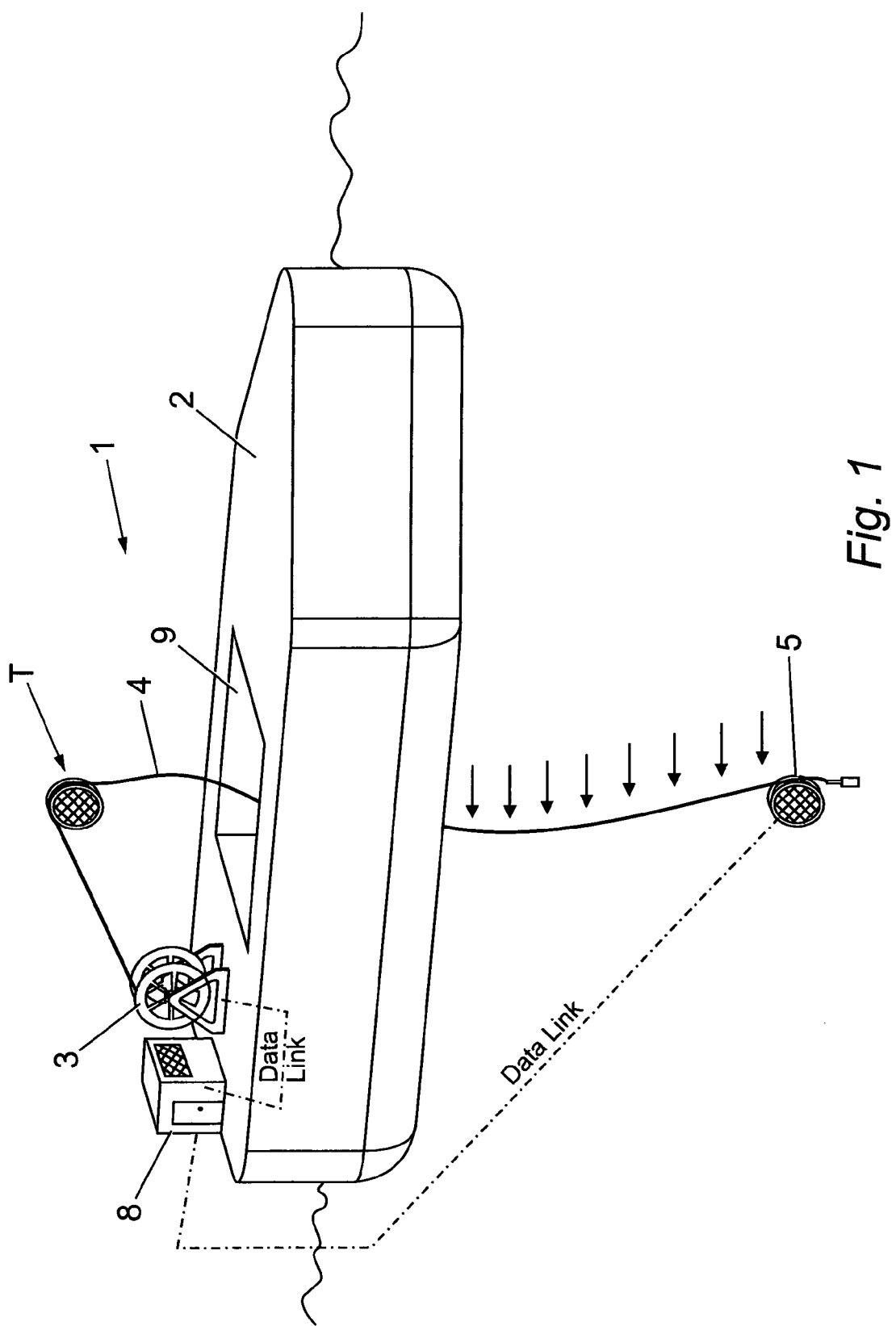
FIG. 1 is a schematic view of a wireline intervention apparatus according to one aspect of the present invention installed on a vessel.

Turning now to the figures, there is shown in FIG. 1 a wireline intervention apparatus 1 according to one aspect of the present invention installed on a vessel 2.

The wireline intervention apparatus comprises a reel 3 mounted on the vessel for storing, paying out and recovering a wire used in a wirelining operation. The wire 4 is spooled onto the reel.

A primary roller 5 is mounted on or adjacent to the subsea installation 6 into which a tool (not shown) is to be run or recovered.

A secondary roller 7 is mounted on the vessel 2. The secondary roller may be mounted in close proximity to the reel 3.

The wire 4 is wound on the reel and passes around each of the secondary and primary rollers 5,7 before entering the subsea installation.

Sensors, not shown, are provided on or adjacent the subsea primary roller 5 to monitor tension, travel and/or speed of the wire.

Primarily such sensors are place between the primary roller 5 and the entry point into the pressure control head in order to monitor and report back the state of the wire as is occurring in the well bore. Additional sensors may be placed above the primary roller 5 in order to monitor the condition of the wire in open water ensure consistent conditions. This latter placement could be used for example to verify that 5 m run in above the primary roller 5 is transferred to 5 m paid out below, so verifying that the no-slippage condition is being maintained.

Alternatively, the sensors may be mounted on the subsea installation 6 to monitor the same parameters on the wire 4.

Control means 8 are provided on the vessel 2 for controlling the operation of the reel 3 and the subsea primary roller 5 and secondary roller 7. Means are provided for passing control signals between the control means 8, the reel 3 and the rollers. This may be for example by fibre optic cabling between the components of the system.

In use, the wire 4 passes from the reel on the vessel and is wound around each of the primary and secondary rollers 5,7 with sufficient turns to prevent slippage. The two rollers and the reel 3 can be set in synchronisation with each other in any combination by the control means with the ability to set any unit as the master and any or both of the primary or secondary rollers as slaves.

In one embodiment, once deployed in place at the seabed the primary roller 5 is locked and the wire 4 is wound in at the reel 3 to place a nominal tension on the wire. This tension effectively sets the tension of the wire in the water column to a nominal figure that is set to keep the movements of the wire in open water manageable, The primary roller 5 is then set into synchronisation with the secondary roller and the reel 3. From this point any movement imparted to the wire 4 by the operator to either pay out or reel in the wire to or from the reel 3 is sensed by the primary and secondary units which perform the same movement.

For example if the reel 3 pays out 5 m of wire, the primary roller 5 and the secondary roller 7 simultaneously payout 5 m. The degree of slack or movement of the wire in the water column does not change and hence the movement of the wire 4 through the pressure control head and into the well bore matches that input at the reel.

In an alternative embodiment, the secondary roller 7 is replaced by a wireline winch mounted directly above the moonpool 9 of the vessel through which the wire passes before entering the water.

In a further alternative, the secondary roller 7 is replaced with a passive roller mounted on the vessel such that the wireline passes from the reel 3, over the passive roller and down through the water column to the primary roller 5.

In normal operations the wireline (and hence wireline tool string) is run in and out of the well at a reasonably fast pace within the capabilities of the reel in order to minimise the length of time on the job. This is done with due consideration of the type of tool, operation and hole conditions being dealt with to ensure that the tools, wells or wire are not damaged e.g. when slowing down to pass known restrictions etc. With the present invention the primary roller will have a similar capability to standard wireline reel units.

A number of devices and/or down hole operations require that the wireline tools be manipulated at high rates to perform their function. These operations are generally referred to as "jarring" where the tool string is required to accelerate and impact strongly in the upward or downward direction.

For upward jarring, accelerators are used. These are tools which store energy applied to them by a steady upwards pull and at a predetermined point when sufficient steady upward pull is applied they will "fire" and transfer the energy stored by the steady pull into upward kinetic energy to effect an impact.

Alternatively the primary roller can be accelerated and the impact imparted by this acceleration alone. In this invention the primary roller 5 may have similar capabilities to existing comparable units.

For downward jarring the technique generally used is to raise a mass which is part of the tool string 19 and is positioned above a set of extending, but connected, elements and then let the mass drop so imparting a downward impact. For this to be effective it is required that the wire can be paid out quickly in order that it does not impede the free fall of the mass.

Although wireline units may have sufficient acceleration and speed to achieve this by powering the reel alone, and the current invention would have similar capabilities, an alternative device is presented that allows free fall without the need for the primary roller to chase the mass down.

On a conventional system on a deepwater well if the wire is paid out quickly at surface the additional line would be taken up by additional curvature in the water column and little or no wire would be fed into the well at sufficient speed to obtain an effective downward impact. When this scenario is viewed with respect to the present invention, when the line is paid out at surface the primary roller 5 subsea will respond and will pay out an equal length of wire at equal speed, this in most cases would be sufficient, but the primary is required to "pull in" the additional wire length from the slack in the water column and so speed could be affected, or alternatively the primary roller power rating would have to be increased to compensate.

The present invention described here places an additional roller 10 (or rollers) between the primary roller 5 and the entry point into the pressure control head 11. During normal operations the additional rollers are passive and the wire simply runs over them.

When upward jarring is required the primary roller 5 can be accelerated to raise the wire 4 at speed, or, the primary roller 5 can be locked in position and the wire accelerated upward by means of an additional linear device such as a mechanical or gas spring that moves one of the additional rollers up or down depending on how it is configured.

Figures 2, 3:
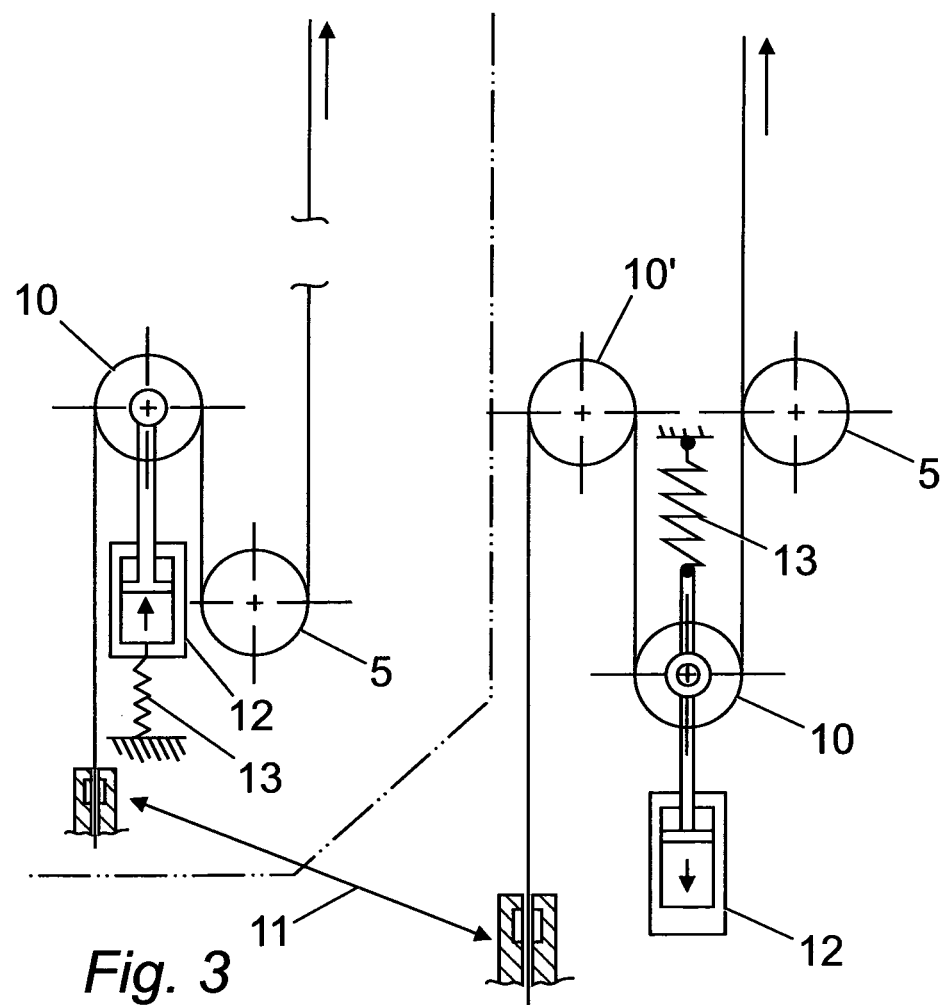
FIG. 2 is a schematic view of the subsea section of the wireline intervention apparatus of FIG. 1.
FIG. 3 is a schematic view of an alternative configuration of the apparatus shown in FIG. 3.

Two alternative configurations are shown in FIGS. 2 and 3. In FIG. 2 two idler rollers 10, 10' are mounted between the primary roller 5 subsea and the pressure control head 11. A driving device 12 such as a piston is mounted adjacent to or in this embodiment below one of the idler rollers and functions to draw the idler roller downwards to lengthen the wire 4 between the primary roller 5 and the pressure control head 11. The driving device may alternatively be an actuator such as a piston of a hydraulic ram, a linear electric motor or a line rotating over a drum.

A return means 13 is provided for the idler roller to restore the roller to the neutral position. In the embodiment shown the return means is a spring mounted above the roller 10. This may be a mechanical or gas spring which extends or compresses as the line is pulled. Alternatively, the driving device may have sufficient power to achieve the movement of the idler sheave directly without the need to provide an additional return means.

When downward jarring is required the idler roller 10 will be pulled down by the driving device 12 (or indirectly by means of a rotary actuator) against the tension of the return means 13. When a point is reached that corresponds to the required length of lift the idler roller 10 is released by remote control and the return means 13 pulls or pushes the moving roller clear so allowing the mass down hole to free fall unimpeded by the any restriction on the wire above the pressure control head 11.

In the embodiment of FIG. 3, only a single idler roller 10 is mounted between the primary roller 5 and the pressure control head 11. In this embodiment both the driving means 12 and the return means 13 are mounted beneath the position adjustable idler roller.

Figure 4:
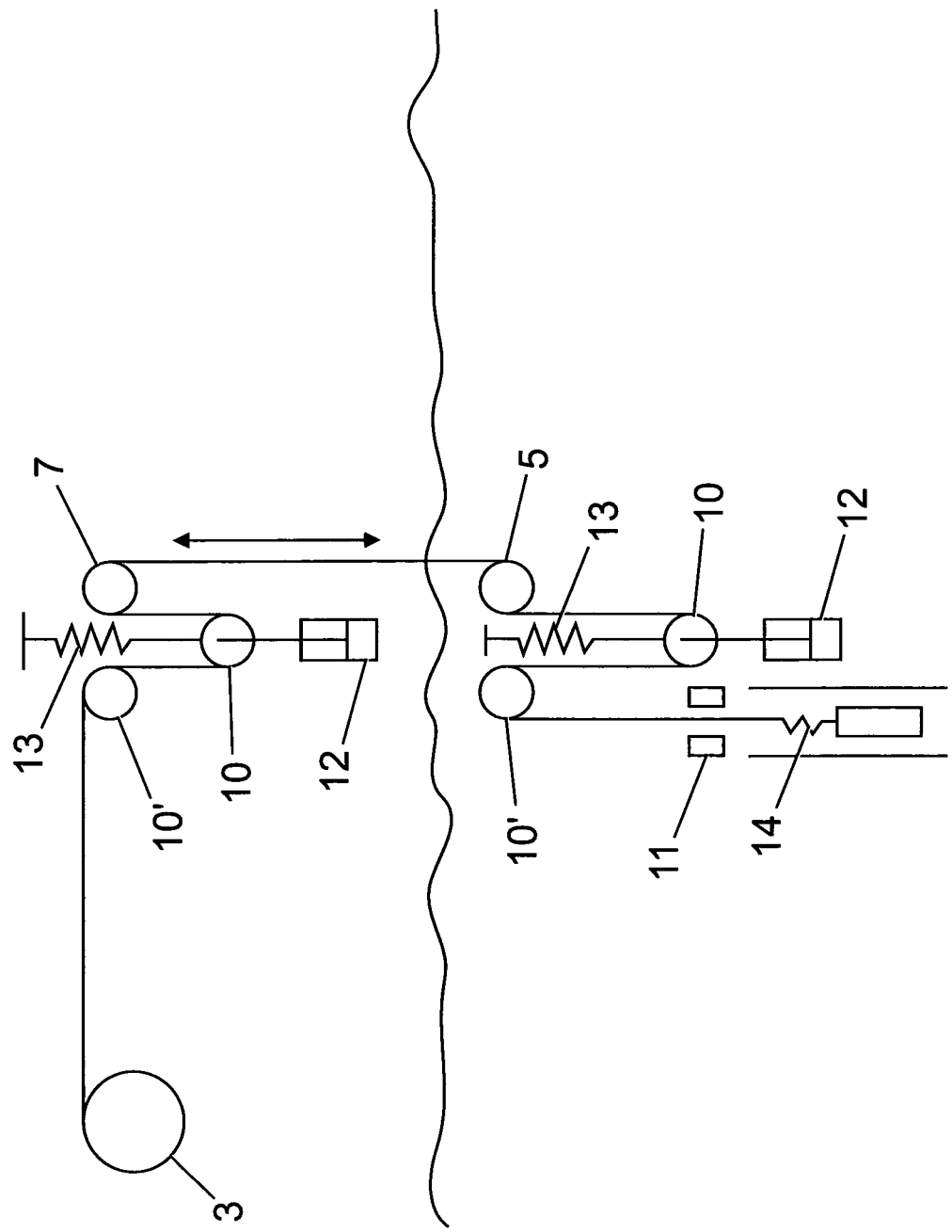
FIG. 4 is a schematic view of a further embodiment of the wireline intervention apparatus of the present invention.
Figure 5:
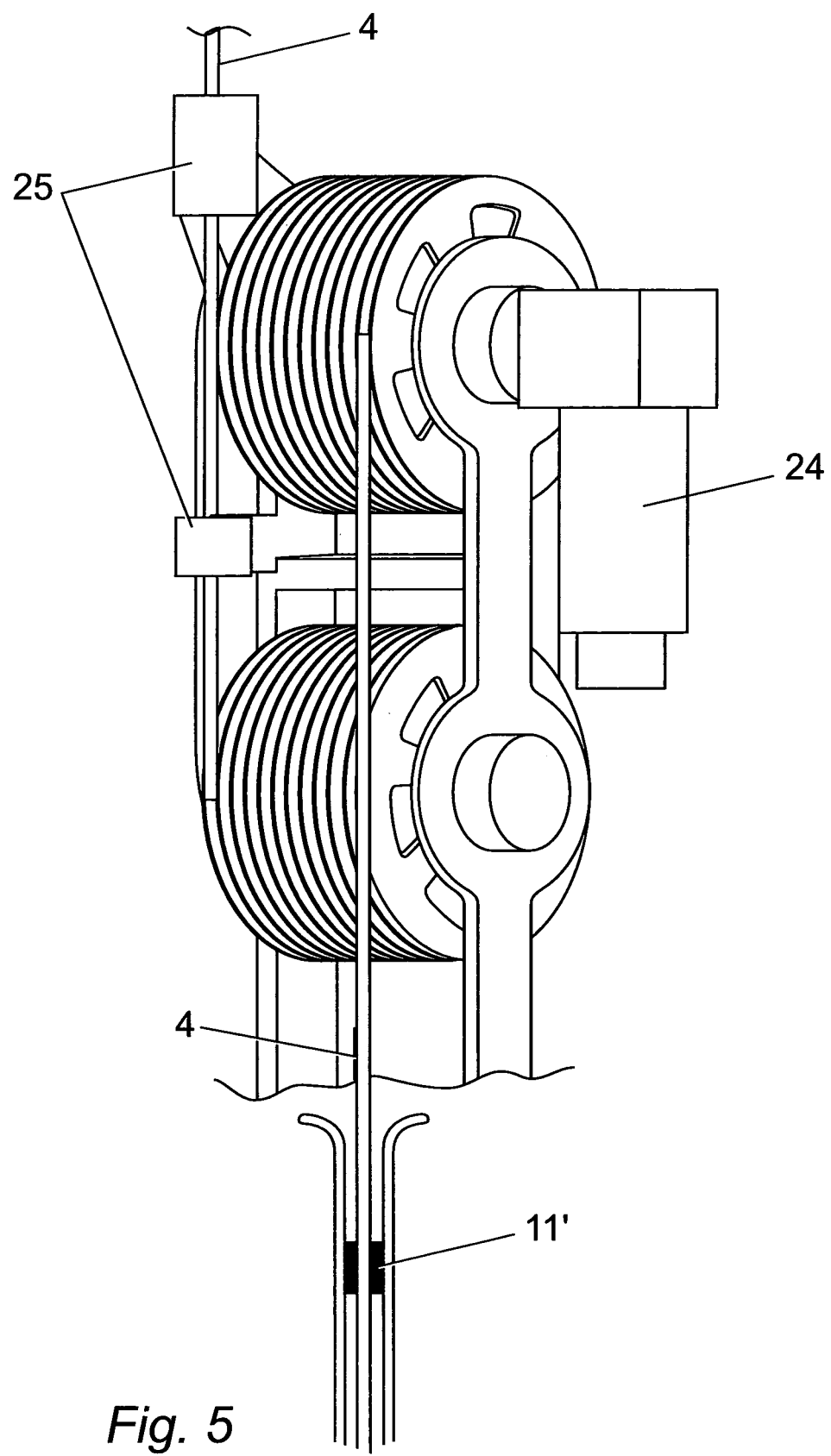
FIG. 5 is a schematic view of a further embodiment of the present invention including the pressure control head.
Figure 6:
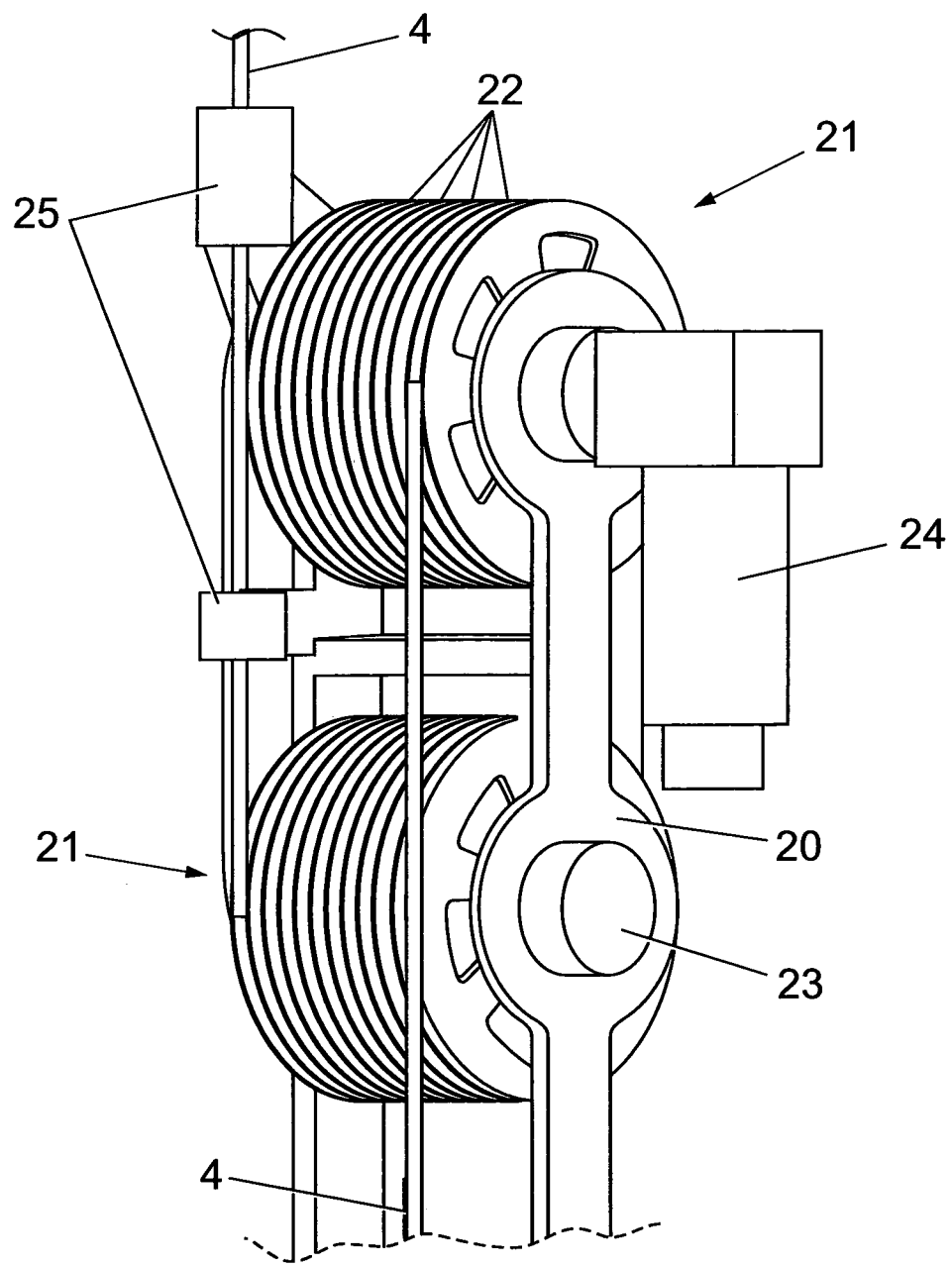
FIG. 6 is a schematic perspective view of the embodiment of FIG. 5.

A further embodiment of the present invention is shown in FIG. 4 in which one or more idler rollers 10, 10' are mounted between the reel 3 and the secondary roller 7 above sea level and one or more idler rollers 10, 10' are mounted subsea between the primary roller 7 subsea and the pressure control head 11.

One of the one or more idler rollers 10 is position adjustable such that the length of wire 4 between the reel 3 and the secondary roller 7 or the primary roller 5 and the pressure control head 11 can be changed. In the embodiment shown, the idler roller 10 is vertically adjustable although other orientations are envisaged.

A driving device 12 as described above such as a piston is mounted adjacent to or other of the idler rollers and functions to draw the idler roller downwards to lengthen the wire between the reel 3 and the secondary roller 7 or the primary roller 5 and the pressure control head 11. The driving device may alternatively be an actuator such as a piston of a hydraulic ram, a linear electric motor or a line rotating over a drum.

Sensors (not shown) mounted on the vessel adjacent to the secondary roller 7 to provide feedback to the control means 8.

A return means 13 as described above is provided for the idler roller 10 to restore the roller to the neutral position. In the embodiment shown the return means is a spring. This may be a mechanical or gas spring which extends or compresses as the line is pulled.

When the main reel 3, primary and secondary rollers 5, 7 are prevented from moving, manual manipulation of the wire 4 is translated to the subsea arrangement of piston 12, spring 13 and sensors. The driving device 12 of the subsea arrangement provides mechanical feed back from the spring 13 when the spring returns to the neutral position.

A fixed length of wire exists between the reel 3 and the secondary roller 7 similarly a fixed length of wire exists between the primary roller 5 and the tool string. When the wire is manually manipulated on the vessel the spring arrangement 13 on the vessel will be compressed; the sensor equipment will translate the movement in the spring and drive the driving device 12 subsea a similar distance.

In order to prevent over tension of the wire 4 resulting in failure, a tension compensation device 14 may be mounted on or adjacent to the tool string. This device allows for the manipulation of the tool string at shallow depths in the well bore by the primary roller 5. Tension sensors in the primary roller 5 react to the tension applied to the wire when in the well bore. When the tension in the wire is near to breaking point the winch will cease to operate preventing the wire from breaking. The tension compensation device may for example be a spring or gas piston.

The over all control of the wire line intervention device invention is by means of computer. The invention allows for the computer to be programmed in specific cases and applications. The invention covers the programming of the computer control to allow for the automated manipulation of the wire and tool string in the well bore.

The apparatus and method described above allows the well established techniques used by wireline operators on the wireline reel to be transferred to corresponding movement and tension of the wire in the well bore while negating the effects of environmental loads on the length of exposed wire. Therefore the wireline operations can be carried out more efficiently in deeper water situations than has previously been possible.

A further embodiment of the invention is shown in FIGS. 5 to 9 in which the primary roller 5 comprises a wireline or e-line mandrel 20 upon which is mounted two sets of sheaves 21, one above the other. Each set of sheaves comprises a plurality of sheaves 22 mounted on a common axle 23. In the embodiment shown a motor 24 is mounted on the mandrel to drive the two sets of sheaves together. The motor may be an electric or pneumatic motor. In other embodiments the motor may be located on the vessel or platform above the sheaves.

One or more guides 25 may also be provided on the mandrel through which the wire passes before it is wrapped around the sheaves. The guides may be provided in the form of brass lines eyelets in the mandrel.

Figure 7:
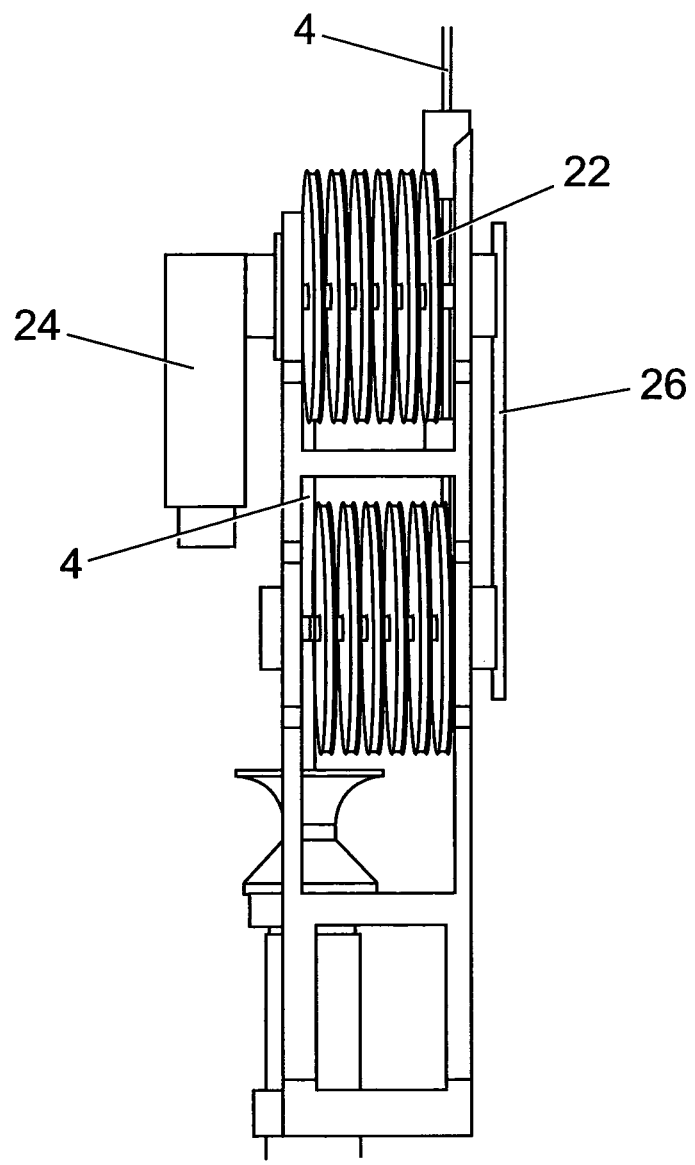
FIG. 7 is a schematic front view of the embodiment of FIG. 5.

The upper and lower sets of sheaves 21 are driven together by a driving device such as a chain drive 26 which transfers a driving force from the motor to the sets of sheaves. In FIG. 7 the chain is removed for clarity.

Figure 8:
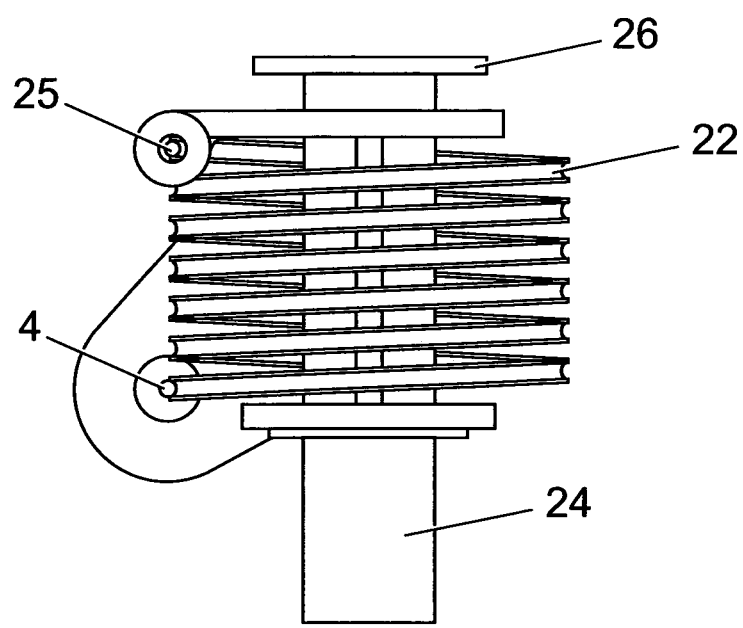
FIG. 8 is a schematic end view from above of the embodiment of FIG. 5.
Figure 9:
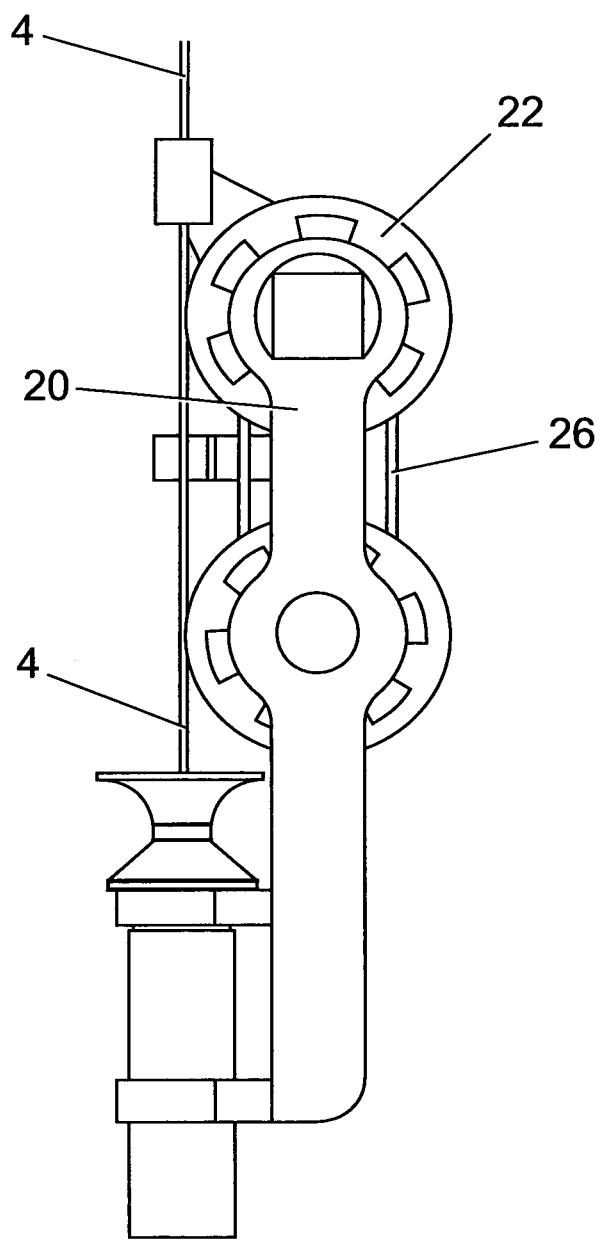
FIG. 9 is a schematic side view of the embodiment of FIG. 5.
Figure 10:
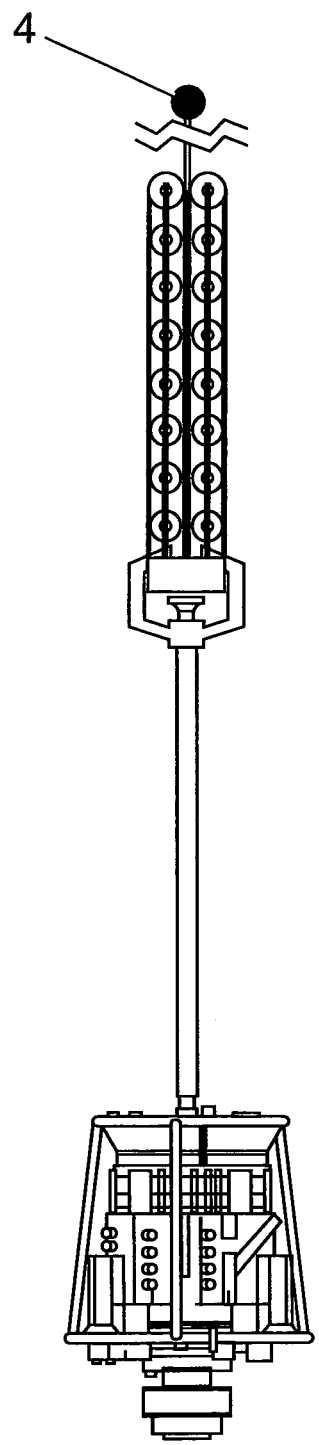
FIG. 10 is a schematic front view of a further embodiment of the present invention.
Figure 11:
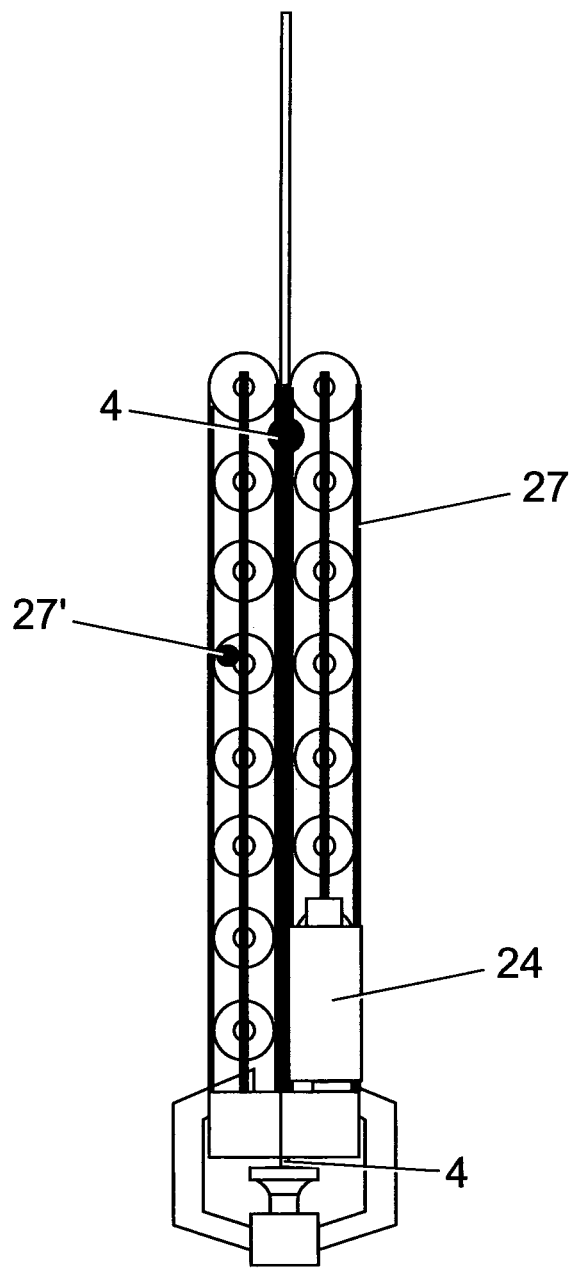
FIG. 11 is an enlarged schematic front view of the embodiment of FIG. 10.
Figure 12:
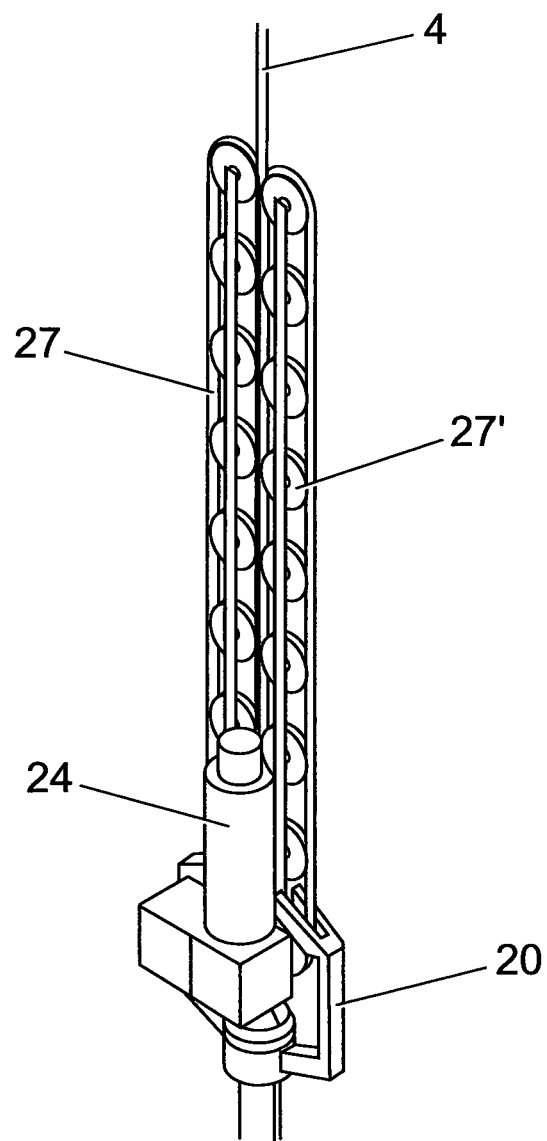
FIG. 12 is a schematic perspective view of the embodiment of FIG. 10.
Figure 13:
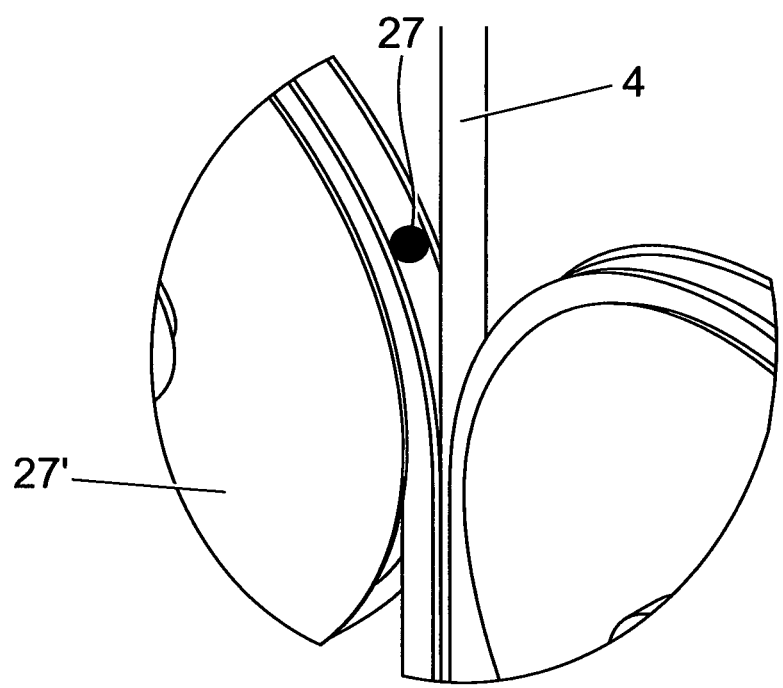
FIG. 13 is an enlarged view of a part of the embodiment of FIG. 10.

Each set of sheaves 21 is preferably angled with respect to the axles 23 as shown in FIG. 8. Preferably the sheaves are obliquely angled upon the axles. In this embodiment the wire enters from the guides onto the first sheave of the lower set, passes around the first sheave and is passed to the first sheave of the upper set of sheaves. The wire then passes between the two sets of sheaves around each subsequent sheave until finally passing around the last upper sheave and down into the pressure control head 11. This ensures that the wire is supported and controlled at all times as it passes around the sheaves and over a greater distance than if the wire only passes around a single roller.

At the surface the wire is wrapped around the sheaves 21 and then fed through the pressure control head 11 as described above. By wrapping the wire around the sheaves (provided that there is sufficient back tension on both ends of the wire) it will create enough friction to prevent the wire from slipping in relation to the sheaves. By operating the motor 24 that drives the sheaves, the wire is forced in or out of the pressure control head 11.

The wire is kept taught above the mandrel by pressure control on the surface vessel winch and the load of the tool string 19 on the wire keeps the wire taught below the mandrel.

In the embodiment illustrated, the mandrel 20 is located subsea above the pressure control head 11. When the motor 24 is operated the sets of sheaves 21 are driven to lower or raise the wire within the well unaffected by water currents or vessel movement. It will be appreciated that the tension control on the surface reel 3 must be under enough tension to keep the wire taught in real time current conditions.

A monitoring device (not shown) may be mounted below the mandrel and above the entry point into the pressure control head 11 in order to monitor the weight on the wire which equates to the tension in the wire below this point and also the distance of wire travel. The monitoring device allows the operator on the surface to know what is happening to the wire in order that he can control and manipulate the wire to perform the required operations in the well.

A pack off 11' on the wire may be provided in the pressure control head 11.

In a further embodiment, the motor could be set up to provide feedback on torque and travel.

In the illustrated embodiment, the mandrel is mounted above a lubricator section but could equally be mounted below this section.

This embodiment of the invention addresses the problem of a wire travelling along the surface of a drum or roller and fouling on the axle of the drum. Alternatively, the surface of the drum could be configured with grooves to operate in a similar manner as the sheaves described above.

A further embodiment of the present invention is shown in FIGS. 10 to 13 in which the sets of sheaves 21 on the mandrel 20 are replaced by two substantially parallel caterpillar tracks 27 through which the wire passes.

The tracks are driven together using an electric or hydraulic motor 24. Preferably the tracks comprise rubber.

The tracks may comprise a plurality of spring loaded pulleys 27' which keep a constant pressure on the wire 4 as it passes between the tracks.

The track may be profiled to suit the particular wire which it drives through the mandrel.

At surface the wire is passed between the tracks 27 and then fed through the pressure control head 11 as normal. A variable hydraulic pressure mechanism such as for example a spring (not shown) or other suitable locking device may be provided to force the tracks together. By operating the electric motor 24, the wire is forced into or out of the pressure head 11.

The profile of the tracks or wheels or pulleys of the caterpillar tracks should be configured to create the maximum contact on the wire to distribute the load forcing the tracks against the wire and thereby preventing any deformation of the cable.

As with the embodiment described above, the mandrel 20 may be mounted above or below a lubricator section 28.

Figure 14:
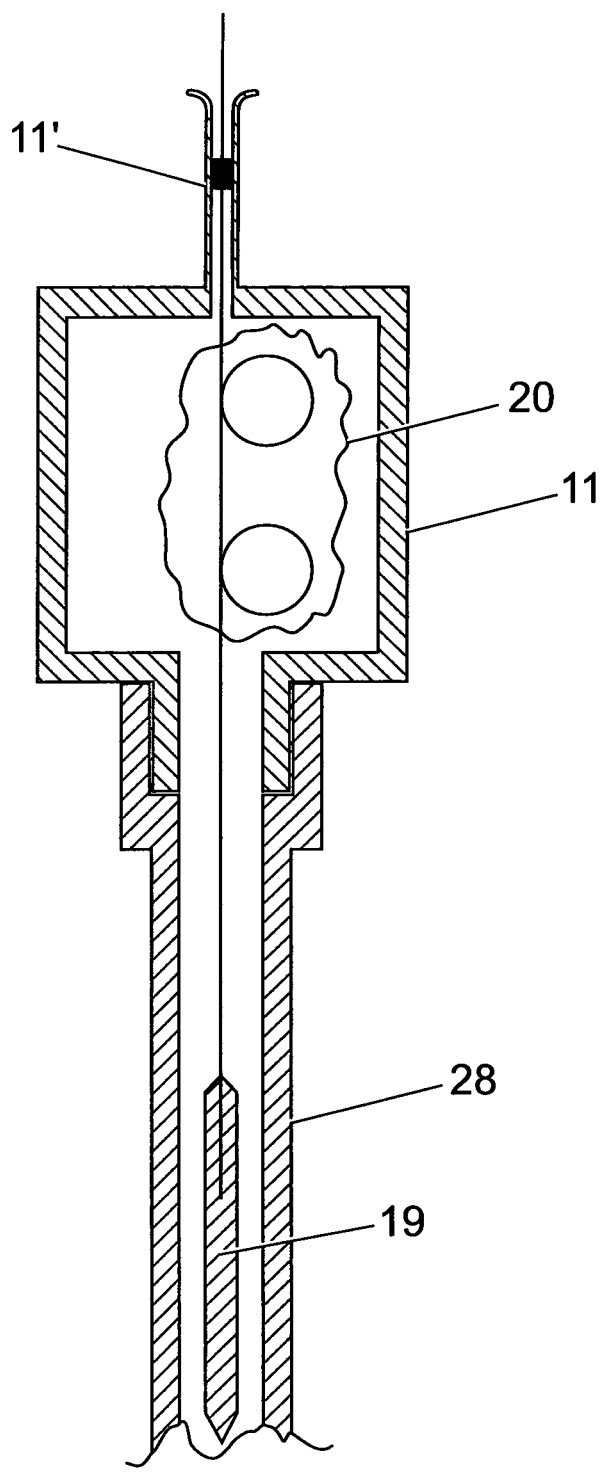
FIG. 14 is a schematic view of a further embodiment of the present invention.

FIG. 14 is a schematic view of a further embodiment of the present invention in which the mandrel 20 with either the sets of sheaves or the caterpillar tracks provided is shown mounted within the pressure head rather than above it as described in the embodiments above.

What is claimed is:

1. A wireline control apparatus for controlling tension in a wireline between a vessel or surface platform and a subsea installation, the apparatus comprising a reel mountable on the vessel or surface platform for controlling a wire in a wireline operation, a primary drive device mountable between the reel and the subsea installation, the wireline being wound around said primary drive device and control means for synchronising the operation of the primary drive device with the reel.

2. An apparatus according to claim 1, in which the primary drive device is mounted on or adjacent the subsea installation.

3. An apparatus according to claim 1, wherein the primary drive device comprises a roller.

4. An apparatus according to claim 1, wherein the primary drive device comprises a plurality of sheaves.

5. An apparatus according to claim 4, wherein the sheaves are mounted on a common axle and are angled with respect to the axle.

6. An apparatus according to claim 4, wherein two sets of sheaves are provided.

7. An apparatus according to claim 6 wherein the sets of sheaves are mounted on a mandrel one above the other.

8. An apparatus according to claim 1, wherein a secondary drive means is mounted on the vessel or surface platform between the reel and the primary drive device.

9. An apparatus according to claim 8, wherein one or more idler rollers are mounted between the primary drive device and the subsea installation and/or the reel and the secondary drive device.

10. An apparatus according to claim 9, wherein one of said idler rollers is position adjustable to alter the length of wire between the primary drive device and the subsea installation and/or the length of wire between the reel and the primary drive device.

11. An apparatus according to claim 9, wherein return means are provided for restoring the idler roller to the neutral position.

12. An apparatus according to claim 8, wherein driving means are provided for altering the position of the idler roller(s).

13. An apparatus according to claim 1, wherein a winch is mounted on the vessel or surface platform between the reel and the primary drive device.

14. An apparatus according to claim 1, wherein sensors are provided on the primary drive device for monitoring operation conditions of the wire.

15. A vessel comprising a wireline intervention apparatus according to claim 1.

16. A method of controlling the tension in a wire of a wireline system mounted between a vessel or surface platform and a subsea installation, said method comprising the steps of passing the wire around a primary drive device between a reel on the surface platform or vessel and the subsea installation, setting the tension of the wire at a predetermined level and controlling the operation of the reel and the drive device in synchronisation to maintain the tension in the wire at the predetermined level during wirelining operations.

17. A method according to claim 16 wherein the method includes the step of mounting the primary drive device on or adjacent the subsea installation.

18. A method according to claim 16, wherein the method further comprises the steps of mounting a secondary drive device between the reel and the subsea installation and controlling both primary and secondary drive devices in synchronisation with the reel.

* * * * *

UNITED STATES PATENT AND TRADEMARK OFFICE
CERTIFICATE OF CORRECTION

| | | |
|---|---|---|
| PATENT NO. | : 8,678,352 B2 | |
| APPLICATION NO. | : 12/531056 | |
| DATED | : March 25, 2014 | |
| INVENTOR(S) | : Lawson et al. | |

It is certified that error appears in the above-identified patent and that said Letters Patent is hereby corrected as shown below:

On the Title Page

Item (73)
  replace "Lewis Limited, Abderdeen (GB)"
  with --Lewis Limited, Aberdeen (GB)--

In the Claims

Column 8, line 17
  replace "drive means"
  with --drive device--

Column 8, line 20
  replace "drive device"
  with --drive means--

Signed and Sealed this
Fifteenth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,678,352 B2
APPLICATION NO. : 12/531056
DATED : March 25, 2014
INVENTOR(S) : Lawson et al.

Page 1 of 1

It is certified that error appears in the above-identified patent and that said Letters Patent is hereby corrected as shown below:

In the Claims

Column 8, line 20
  replace "drive means"
  with --drive device--

Signed and Sealed this
Fourth Day of November, 2014

Michelle K. Lee
*Deputy Director of the United States Patent and Trademark Office*